United States Patent [19]

Feliks

[11] 4,074,619
[45] Feb. 21, 1978

[54] HEADING MACHINE

[75] Inventor: James J. Feliks, Doraville, Ga.

[73] Assignee: The Mead Corporation, Dayton, Ohio

[21] Appl. No.: 740,476

[22] Filed: Nov. 10, 1976

[51] Int. Cl.² .............................................. B31B 17/60
[52] U.S. Cl. ............................ 93/55.1 R; 93/DIG. 1; 156/69; 156/497
[58] Field of Search ......... 93/55.1 R, 55.1 M, 55.1 P, 93/39.1 R, 39.1 P, 39.2, 39.3, DIG. 1, 36.5 R; 156/69, 497; 53/42

[56] References Cited

U.S. PATENT DOCUMENTS

| | | | |
|---|---|---|---|
| 2,966,833 | 1/1961 | Leibreich | 93/55.1 R |
| 3,028,798 | 4/1962 | Allen | 93/55.1 R |
| 3,475,243 | 10/1969 | Scalora | 53/42 UX |
| 3,602,690 | 8/1971 | Rosenberg et al. | 93/55.1 R X |
| 3,604,320 | 9/1971 | Duvall et al. | 93/55.1 R |
| 3,724,093 | 4/1973 | Olila | 93/44.1 GT X |
| 3,825,408 | 7/1974 | Farfaglia et al. | 93/DIG. 1 X |

*Primary Examiner*—James F. Coan

*Attorney, Agent, or Firm*—Walter M. Rodgers; Walter A. Rodgers

[57] ABSTRACT

A drum heading machine for securing a closure plate within an end of a tubular element or sleeve includes a mandrel for supporting the sleeve thereabout with an end of the sleeve projecting beyond an end of the mandrel to define a sealing area on the inner surface thereof and for supporting a closure plate disposed within the sealing area of the sleeve and in contact with the adjacent end of the mandrel, the outer peripheral sealing edge area of the closure plate being arranged to engage the inwardly crimped sealing area of the sleeve and at least one of the sealing areas being coated with thermoplastic material, a reciprocable header arranged to engage and crimp the projecting end of the tubular element inwardly to force said sealing areas into sealing contact with each other, and pneumatic means forming a part of the header and operable before crimping of said end of the tubular element is completed for simultaneously directing hot air to the entire outer peripheral sealing edge area of the closure element and to the entire sealing area of said tubular element.

8 Claims, 7 Drawing Figures

HEADING MACHINE

U.S. Pat. Nos. 2,966,833 and 3,012,483, both assigned to the assignee of this invention, disclose and claim heading machines for closing an end of a sleeve. In arrangements of the type disclosed and claimed in both of these patents, a header forces the end edges of the sleeve inwardly and into flat face contacting relation with the peripheral outer edge of the closure member and the sealing areas may be coated with thermoplastic material which is melted by heat applied by conduction from a heated machine element. While the arrangements of the type disclosed in the two aforementioned patents function satisfactorily, the sealing operation is time consuming and inefficient due to the fact that the parts to be sealed are normally formed of paperboard having heat insulating properties.

According to this invention in one form, thermoplastic material which is used to coat at least one of the elements to be sealed is heated by a stream of hot air conveniently directed through jet passages formed in the header element. According to a feature of the invention, hot air is applied simultaneously to all areas to be heated from a manifold via jet passages in the header and dispersion of air within the manifold chamber is facilitated by means of a baffle plate appropriately configured and disposed in the path of incoming hot air in such manner as to insure substantial dispersion of hot air throughout the manifold area and to the entry ends of all of the jet passages so that all sealing areas are simultaneously and quickly heated.

For a better understanding of the invention reference may be had to the following detailed description taken in conjunction with the accompanying drawings in which FIG. 1 is a perspective view of a header machine embodying the invention and which depicts the machine during the initial stages of a sleeve closing operation;

FIG. 3 is a cross section of the upper portion of FIG. 2 and which shows the parts in the positions they occupy during a heat applying operation; and in which

Figure 1:
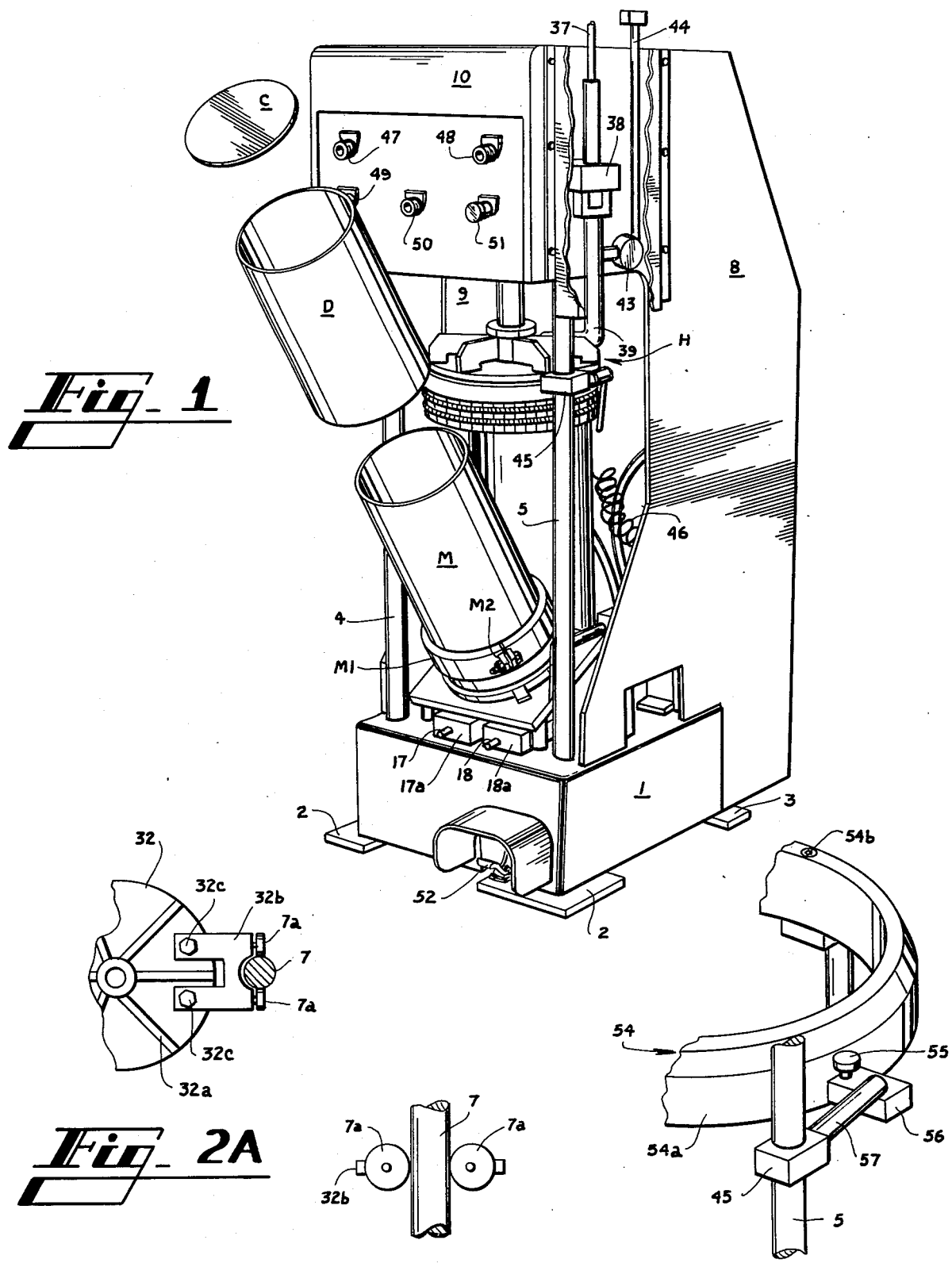
Figures 2A, 2B:
FIG. 2A is a cross sectional view taken on line 2A—2A in FIG. 2.
FIG. 2B is a view from the right hand side of FIGS. 2 and 2A.
Figure 2C:
FIG. 2C is a cross sectional view taken on line 2C in FIG. 2.
Figure 2:
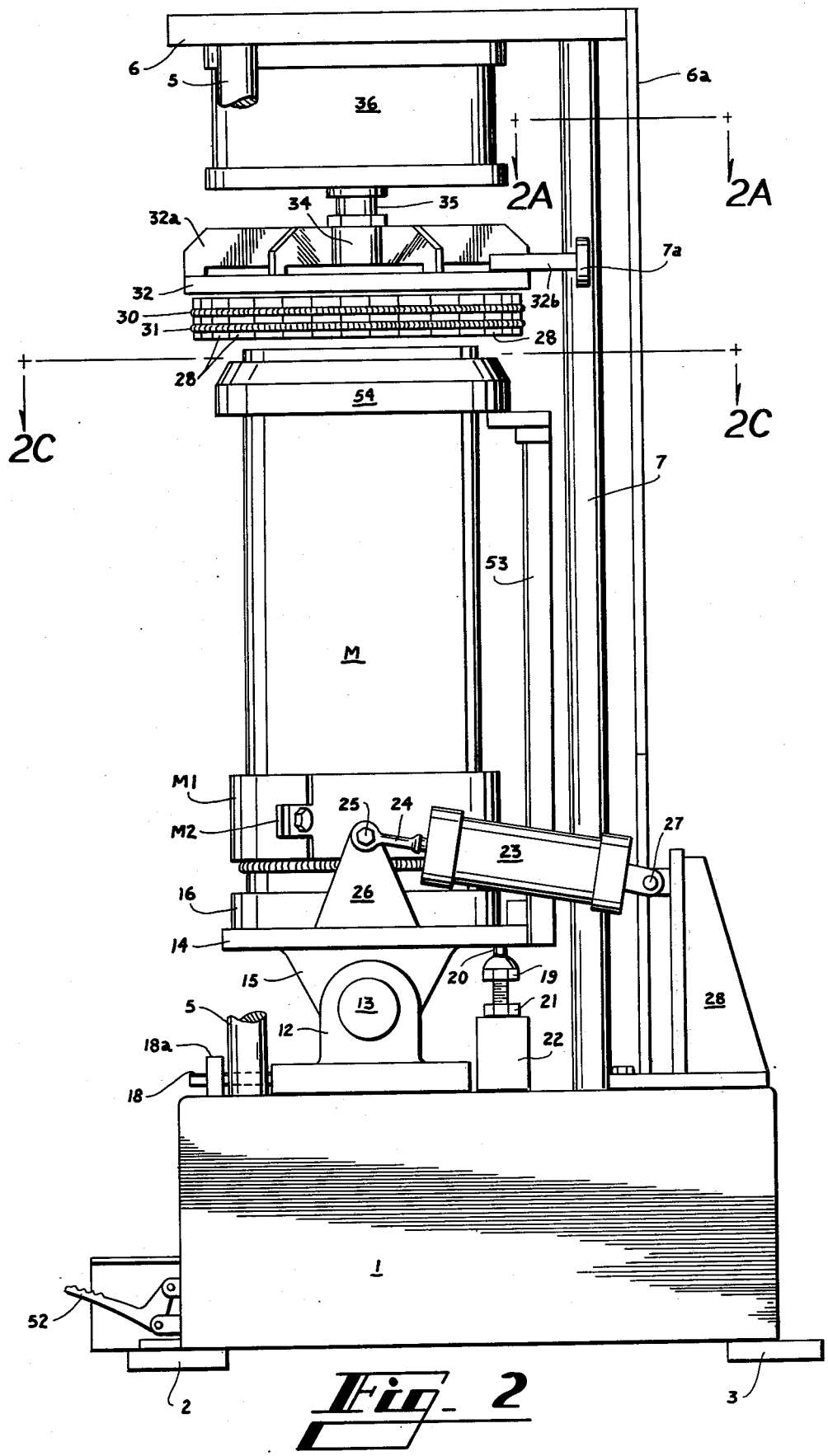
FIG. 2 is an enlarged side view of the machine shown in FIG. 1 and with certain parts broken away for clarity.

As is best shown in FIGS. 1 and 2, the machine includes a base 1 supported by front feet 2 and back feet 3 only one of which is observable in the drawings. Support posts 4 and 5 are mounted by any suitable means to base 1 and project upwardly to support top plate 6 at its forward edge. The back edge of top plate 6 is supported by one back post 7. Side walls 8 and 9 are secured by any suitable means to the base 1, to top wall 6 and to back wall 6a while front wall 10 depends downwardly from top wall 6 to form a support for control panel 11.

Figure 3:
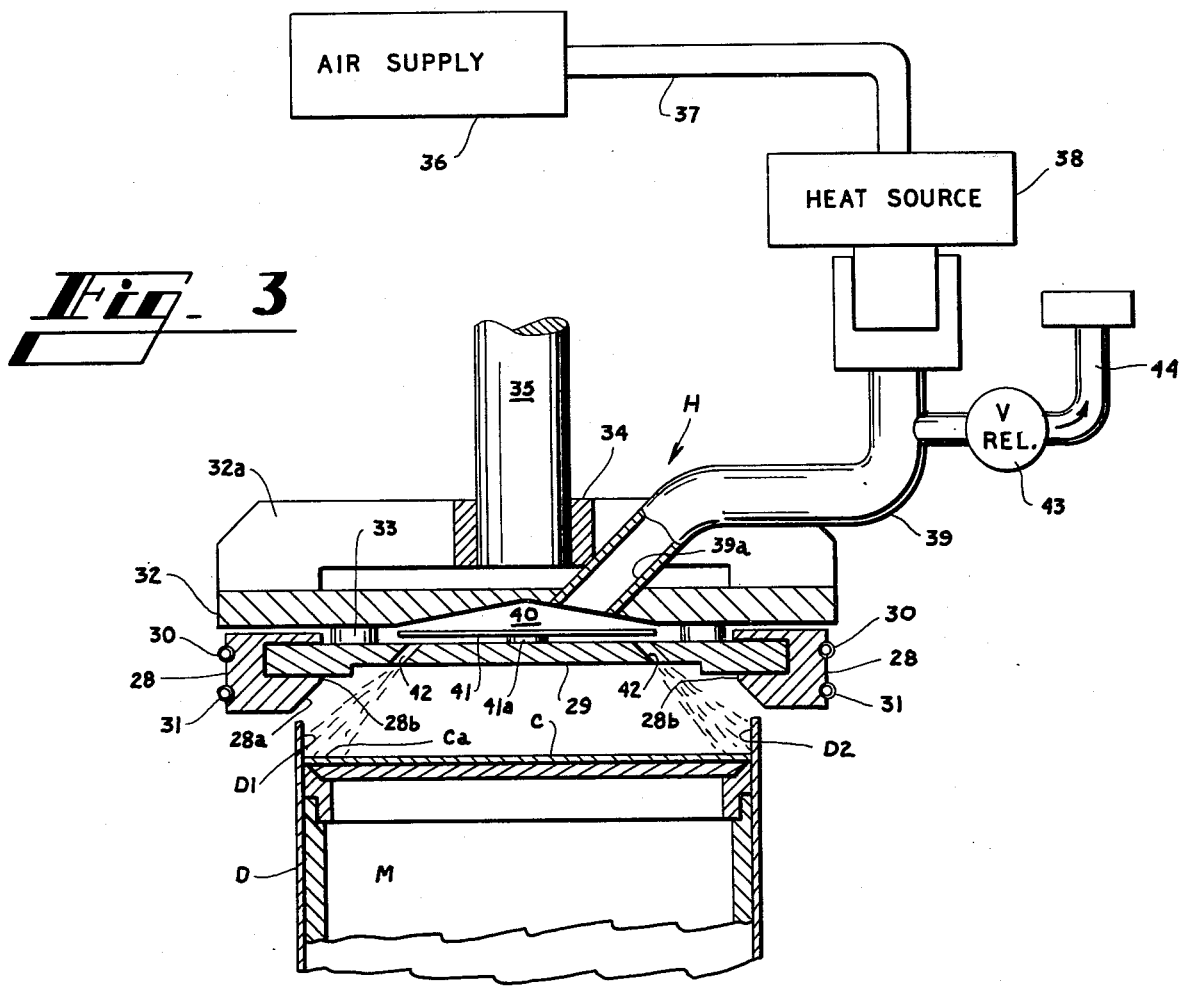

In order to facilitate mounting of the tubular element or sleeve D such as might be formed of paperboard about the mandrel M as best shown in FIG. 2, the mandrel M is tilted outwardly following which the tubular element or sleeve D is manually inserted about the mandrel M and into engagement with adjustable stop collar M1 in such a way that its upper end portion designated D1 and as best shown in FIG. 3 projects upwardly and the closure element C which might be formed of paperboard is then inserted into the upper end D1 of the sleeve D and into contact with the upper end of mandrel M. Adjustment of the stop collar M1 may be made via bolt M2 as is obvious. Thereafter the mandrel M, sleeve D, and closure C are tilted into an upright position as shown in FIG. 2 so as to condition the machine for performing a heading operation.

In one form of the invention, sleeve D and closure C are completely coated on all surfaces with thermoplastic coating material such as polyethylene. Of course it may not be necessary for all applications of the invention to coat all areas of these parts but rather simply to coat the sealing area of either one or of both parts.

As is best shown in FIG. 2, a bearing structure 12 is secured atop base 1 and a rock shaft 13 is rotatably mounted in bearing structure 12. A table 14 is secured by brackets 15 to shaft 13 and mandrel M is mounted inside support plate 16 mounted on plate 14. Adjustment of structure 12 from left to right as viewed in FIG. 2 is by means of rotatable threaded adjusting elements 17 and 18 and their studs 17a and 18a into which the studs are threaded and which are best shown in FIG. 1.

The extreme tilting travel of mandrel M in a clockwise direction about shaft 13 is limited by adjustable stop 19 which engages abutment element 20 formed on table 14. A lock nut 21 secures adjusting bolt 19 in any desired position atop the support 22 which in turn is mounted on base 1.

For the purpose of imparting tilting movement to table 14 and associated structure, a pneumatic cylinder 23 is provided and comprises a cylinder and a piston, the piston rod 24 being connected at pin 25 to bracket 26 secured atop table 14. The pneumatic cylinder 23 is pivoted at 27 to the bracket 28 which in turn is secured to the base 1 by any suitable means. Thus pneumatic cylinder 23 effectively tilts the table 14 and the mandrel M in a counterclockwise direction as viewed in FIG. 2 into the position shown in FIG. 1 to condition the machine for the start of a sleeve heading operation. With the mandrel tilted to the position shown in FIG. 1, the sleeve D and closure C are manually applied whereupon pneumatic cylinder 23 then swings the parts to the sealing position shown in FIG. 2.

Inward crimping of the projecting end portion D1 of sleeve D is by means of a plurality of segments 28 mounted on circular pressure pad 29 and biased inwardly by a pair of garter springs 30 and 31. The structure 28–31 is fully disclosed in the aforementioned two patents.

Pressure pad 29 is mounted on support element 32 by means of support ring 33, support element 32 having radial ribs 32a and a hub 34 secured to operating rod 35 which is vertically reciprocable by means of pneumatic cylinder 36.

Figure 4:
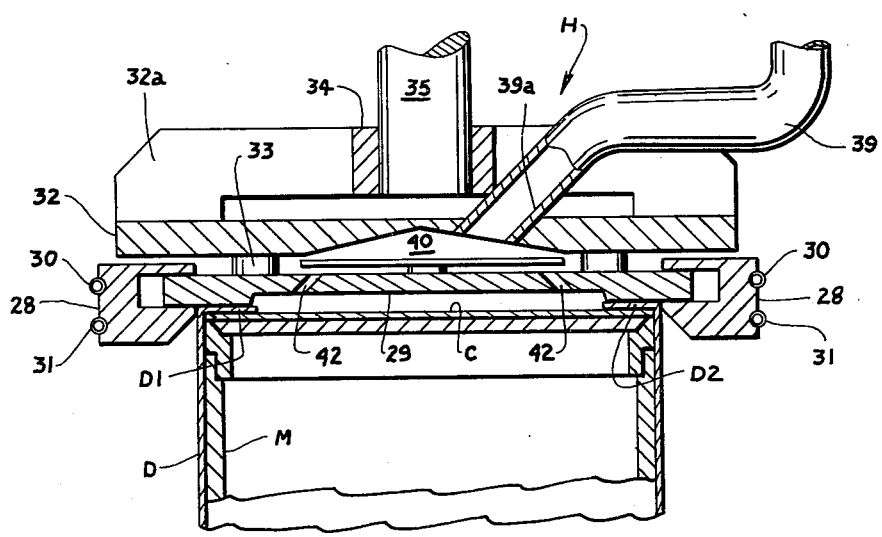
FIG. 4 is a view similar to FIG. 3 but which shows the parts during a pressure applying operation following application of hot air to the sealing surfaces.

In order to crimp the projecting end D1 of sleeve D inwardly, the header comprising support element 32, support ring 33, pressure pad 29 and crimping segments 28 is lowered downwardly from the position indicated in FIG. 3 to that indicated at FIG. 4. Downward movement causes the bevelled surface 28a of each crimping segment 28 to engage the projecting end D1 and to force that end inwardly. During this operation the segments 28 expand outwardly radially as each bevelled surface 28a moves downwardly until the vertical portion 28b of each segment is disposed in line with the outer surface of sleeve D. At this point pressure pad 29 forces the sealing area D2 of part D1 into flat face contacting relation with the peripheral sealing edge area Ca of the closure plate C.

Prior to and during the above described movement of the header H from the position shown in FIG. 3 to that shown in FIG. 4, a supply of hot air is directed from a source 36 through conduit 37, heater 38, and conduit 39 to the manifold chamber 40 of the header H through inlet passage 39a formed in support structure 32. Heated air is dispersed throughout the header chamber 40 by baffle plate 41 mounted on post 41a and is then simultaneously directed through a plurality of angularly disposed jet passages 42 to heat the outer peripheral sealing edge Ca of closure C and to melt the thermoplastic coating thereon while simultaneously directing blasts of hot air throughout the inner periphery D2 of the end portion D1 of sleeve D so as to heat the entire sealing area D2. Thereafter movement of the header downwardly from the position shown in FIG. 3 to that shown in FIG. 4 forces the sealing areas into firm high pressure contact and effects an efficient heat sealing operation.

It should be noted that the application of heat is made simultaneously to the sealing area Ca of the closure element C and of the sealing area D2 of part D1 of sleeve D. This application of heat is made simultaneously because the jet passages 42 are disposed completely about and below the peripheral portion of the circular baffle plate 41 and due to the fact that the baffle plate 41 insures that hot air entering inlet passage 39a is dispersed efficiently to the upper entry ends of all the jet passages 42.

During the sealing stage of the heading operation as represented by FIG. 4, hot air supplied to the work cannot escape and for this reason a relief valve 43 is mounted in relief conduit 44 and allows pressure to escape to atmosphere which is above a predetermined value.

As is apparent in FIGS. 2, 2A, and 2B, vertical reciprocable motion of the header H is guided and controlled by means of the post 7 and the rollers such as are indicated at 7a in FIG. 2a which are secured to the header H via plate 32b and bolts 32c and are guided vertically along the post 7.

While the melting of the thermoplastic material according to this invention is by hot air, it is desirable to maintain the pressure pad 29 at a predetermined minimum temperature. Toward this end electric heater elements (not shown) are mounted on pad 29 and energized by helical conductor 46 which in springlike fashion can accommodate up and down movement of header H.

The operation of the machine is controlled primarily by the devices mounted on control panel 11. On that panel a pair of manually operable push buttons 47 and 48 are mounted. In addition a pilot lamp 49 is used to indicate that the main power source is energized and pilot lamp 50 indicates that air pressure is available from the air supply 36. An emergency stop button 51 automatically raises header H and tilts mandrel M outward when actuated.

In order to initiate a heading operation from the position shown in FIG. 1, and with sleeve D and closure C in place of Mandrel M, the machine is started, after all pilot lights are energized, by operating both the push buttons 47 and 48. The two push buttons are interlocked and are simply for the purpose of insuring that both hands of an operator are clear of the mandrel M and the header H when an operation is initiated following mounting of the sleeve D on the mandrel M and insertion of the closure C into the upper end of the sleeve D. Thus with the push buttons 47 and 48 manually operated, the machine automatically causes mandrel M to tilt to the upright position shown in FIG. 2 by the action of pneumatic cylinder 23 whereby the sealing areas Ca and D2 are heated by means of hot air. Following and during this action, pneumatic cylinder 36 drives the mandrel downwardly and completes the operation. Thereafter the drum is automatically returned to the position shown in FIG. 1 by reverse operation of pneumatic cylinder 23.

In order to remove the sleeve D and its closure C from the mandrel M, foot pedal 52 is depressed and parts disposed inside the mandrel M elevate the sleeve D and closure C somewhat at which position the closed drum can be manually removed.

For the purpose of insuring that the sleeve D assume a substantially round and uniform configuration, semicircular structure 54 having clamping arms 54a pivoted at 54b to support 53 is mounted on support 53 which in turn is mounted on table 14 and imparts pressure to the outer surface of sleeve D via rollers 55 mounted on plates 56 and rods 57 supported by blocks 45 to cause that sleeve properly to conform in a uniform fashion with the mandrel M. The arms 54a also hold the finished drum in place while the header H retracts.

The embodiments of the invention in which an exclusive property or privilege is claimed are defined as follows:

1. A heading machine for securing the outer peripheral sealing edge area of a closure plate to an inner sealing area at one end of a tubular element, at least one of said sealing areas being coated with thermoplastic material, said machine comprising a mandrel for supporting a tubular element thereabout with an end of said tubular element projecting beyond an end of said mandrel to define a sealing area on the inner surface thereof and with a closure plate disposed within said end of said tubular element and in engagement with said end of said mandrel, a reciprocable header including a support element, a pressure pad mounted on said support element and defining a manifold therebetween, a plurality of jet passages formed in said pressure pad and arranged to direct hot air from said manifold toward said sealing area and said sealing edge area, and outwardly expandable inwardly biased crimping segments mounted on said pressure pad and arranged to engage and crimp the projecting end of said tubular element inwardly, said pressure pad being engageable with the crimped projecting end of said tubular element and being effective to impart sealing force thereto.

2. A machine according to claim 1 wherein a pair of clamping arms are arranged to engage the outer surface of said tubular element to force said tubular element into conformity with said mandrel.

3. A machine according to claim 1 wherein said jet passages are arranged in a pattern corresponding to but smaller than the shape of said closure plate.

4. A machine according to claim 3 wherein said jet passages are directed angularly outward.

5. A heading machine for securing the outer peripheral sealing edge area of a closure plate to an inner sealing area at one end of a tubular element, at least one of said sealing areas being coated with thermoplastic material, said machine comprising a mandrel for supporting a tubular element thereabout with an end of said tubular element projecting beyond an end of said mandrel to define a sealing area on the inner surface thereof and with a closure plate disposed within said end of said tubular element and in engagement with said end of said mandrel, a reciprocable header including a support element, and a pressure pad mounted on said support element and defining a manifold therebetween, said header being arranged to engage and crimp the projecting end of said tubular element inwardly and to force said sealing area into face contact with the outer peripheral sealing edge area of said closure element, an air inlet passage formed in said support element, and a baffle plate disposed in said manifold and arranged in the path of flow of air entering said manifold through said inlet passage for effecting dispersion of hot air supplied to said manifold through said inlet passage whereby hot air is directed to the entire outer peripheral sealing edge area of said closure element and to the entire sealing area of said tubular element.

6. A machine according to claim 5 wherein a plurality of jet passages are formed in said pressure pad with their entry ends arranged in a pattern corresponding to the shape of said baffle plate.

7. A machine according to claim 6 wherein the entry ends of said jet passages are arranged in a pattern smaller than said baffle plate.

8. A heading machine for securing the outer peripheral sealing edge area of a closure plate to an inner sealing area at one end of a tubular element, at least one of said sealing areas being coated with thermoplastic material, said machine comprising a mandrel for supporting a tubular element thereabout with an end of said tubular element projecting beyond an end of said mandrel to define a sealing area on the inner surface thereof and with a closure plate disposed within said end of said tubular element and in engagement with said end of said mandrel, a reciprocable header arranged to engage and crimp the projecting end of said tubular element inwardly to force said sealing area into face contact with the outer peripheral sealing edge area of said closure element, and pneumatic means forming a part of said header and operable before crimping of said end of said tubular element is completed for simultaneously directing hot air to the entire outer peripheral sealing edge area of said closure element and to the entire sealing area of said tubular element, said pneumatic means including an inlet conduit interconnecting a source of hot air and said header, and pressure relief means arranged to vent said inlet conduit to atmosphere in response to the establishment of a predetermined pressure within said header.

* * * * *